United States Patent [19]
Kim

[11] Patent Number: 5,932,947
[45] Date of Patent: Aug. 3, 1999

[54] CONCENTRICITY CONTROL APPARATUS FOR ACTIVE MAGNETIC JOURNAL BEARING OF INDUCTION MOTOR

[75] Inventor: Ki-Bong Kim, Suwon, Rep. of Korea

[73] Assignee: Samsung Electronics Co., Ltd., Kyungki-Do, Rep. of Korea

[21] Appl. No.: 09/012,769

[22] Filed: Jan. 26, 1998

[30] Foreign Application Priority Data

Sep. 23, 1997 [KR] Rep. of Korea ............... 97-48355

[51] Int. Cl.⁶ ............................................. H02K 7/09
[52] U.S. Cl. .............................................. 310/90.5
[58] Field of Search ....................................... 310/90.5

[56] References Cited

PUBLICATIONS

Stephens et al., "Effect of Magnetic Pole Arrangement on Core Loss in Laminated High–Speed Magnetic Journal Bearings", IEEE Transactions on Magnetics, vol. 32, No. 4, Jul. 1994, pp. 3246–3252.

Sivadasan, "A Novel Magnetic Suspension Cum Linear Actuator System for Satellite Cryo Coolers", IEEE Transactions on Magnetics, vol. 30, No. 3, May 1994, pp. 1258–1262.

Primary Examiner—Nestor Ramirez
Assistant Examiner—K. E. Tamai
Attorney, Agent, or Firm—Larson & Taylor

[57] ABSTRACT

A concentricity control apparatus induction for controlling a concentricity between a stator body and a rotor body in an induction motor. The concentricity control apparatus for a concentricity controlling induction motor has a sensor for detecting an eccentricity of a rotor body, an operating unit for operating an electrical current in order to correct an eccentricity according to the detection of the sensor, and a driving circuit for controlling the electrical current of the rotor body. A core control unit so constructed as to apply to a core direction of the rotor body an electromagnetic force perpendicular to a central rotating shaft of the rotor body.

3 Claims, 4 Drawing Sheets

CONCENTRICITY CONTROL APPARATUS FOR ACTIVE MAGNETIC JOURNAL BEARING OF INDUCTION MOTOR

BACKGROUND OF THE INVENTION

1. Field of the Invention

The present invention relates to a concentricity control apparatus, and more particularly to a concentricity control apparatus for controlling a concentricity between a stator body and a rotor body in an induction motor.

2. Description of the Prior Art

Generally, a rotor assembly in an induction motor is rotated at a lower speed than a synchronous rotational speed by a rotary magnetic field induced at a stator assembly.

The induction motor includes a cylindrical core having a plurality of poles continuously formed therein, a stator assembly, a rotor assembly and a bearing.

In other words, when an electrical current applied to the stator assembly forms a rotary magnetic field at a predetermined number of poles, a certain electrical current is induced in the rotor assembly to rotate a rotor.

Particularly, a concentricity controlling induction motor disposed with a concentricity control apparatus such as an Active Magnetic Bearing AMB and the like is used for reduced generation of heat caused by rotation of the rotor assembly in the motor rotating at a high speed.

The AMB is treated in a paper authored on Jul. 4, 1996 by L. Scott Stephens and Carl R. Knospe, titled as "Effect of Magnetic Pole Arrangement on Core Loss in Laminated High-speed Magnetic Journal Bearing".

The concentricity control apparatus as illustrated in FIG. 5 is disposed with a rotary body 50, a stator body 52, a plurality of driving coils 54, a sensor 55 and an operation unit 56.

In other words, when a concentricity controlling induction motor is rotated by an operation circuit (not shown), the sensor 55 detects a position of the rotary body 50, that is, a concentric status of the stator body 52 and the rotor body 50.

At this time, an eccentricity of the rotor body 50 to one side is detected, transmitted to the operation unit 56, and then the eccentric position is transmitted to the driving circuit 53.

When the eccentricity is transmitted to the operation unit 56, a residual amount of current large enough to offset the eccentricity is supplied from the operation unit 56 to the respective driving coil 54 which is located at the eccentric position.

When an offsetting or correcting current is supplied to the respective driving coil 54, a correcting magnetic force is generated from a pole 51 and the driving coil 54, so that simultaneously the rotor body 50 is pushed to eliminate eccentricity.

Of course, in order to more accurately control the eccentricity of the rotor body 50, a good many poles, that is, a combination of respective poles 51 and driving coils 54 are needed and a very accurate driving circuit 53 is necessary to respectively control same.

SUMMARY OF THE INVENTION

However, there is a problem in that a large number of poles and driving coils are required at a rotor body in order to adjust a concentricity of the rotor body and stator body in a concentricity controlling induction motor and the concentricity controlling induction motor tends to be very complicated in structure to thereby increase a manufacturing cost.

There is another problem in that many errors occur to decrease a control reliability.

Accordingly, the present invention is presented to solve the aforementioned problems and it is an object of the present invention to provide a concentricity control apparatus for a concentricity controlling induction motor in which construction thereof is simplified to decrease a manufacturing cost and to increase a control reliability.

In accordance with the object of the present invention, there is provided a concentricity control apparatus for a concentricity controlling induction motor having a sensor for detecting an eccentricity of a rotor body, an operating unit for operating an electrical current in order to correct an eccentricity according to the detection of the sensor, and a driving circuit for controlling the electrical current of the rotor body, the apparatus comprising: core control means so constructed as to apply to a core direction of the rotor body an electromagnetic force perpendicular to a central rotating shaft of the rotor body.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
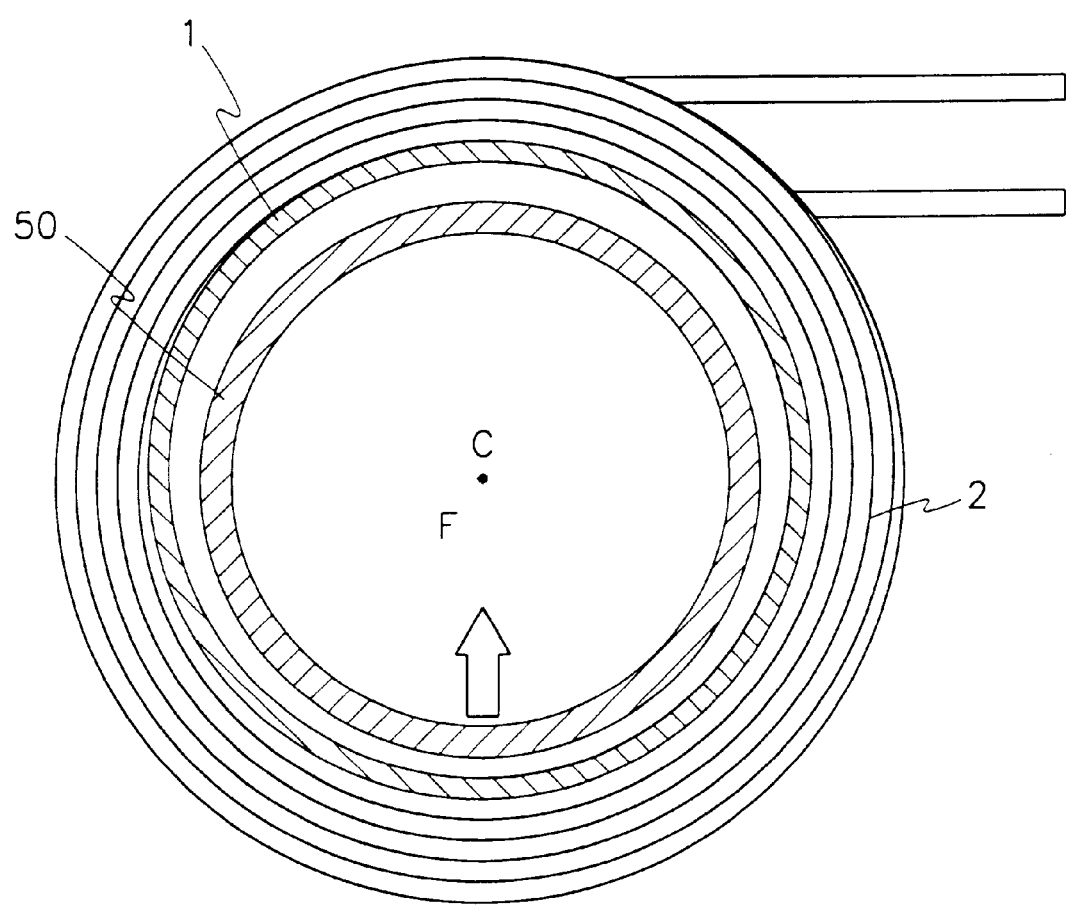
FIG. 1 is a schematic diagram for illustrating a concentricity control apparatus for an induction motor according to the present invention.
Figure 2:
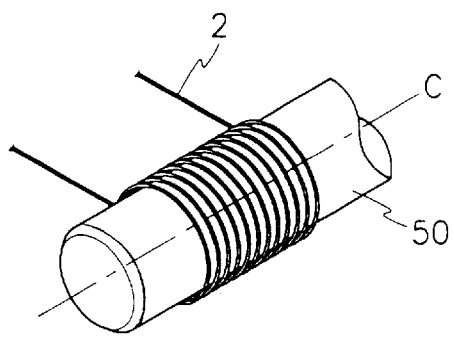
FIG. 2 is a schematic perspective view of FIG. 1.

As illustrated in FIGS. 1 and 2, core control means so constructed as to apply an electromagnetic force to a centerline C of a rotor 50 is disposed therein. The core control means includes a core 1 cylindrically formed without any poles thereon and a coil 2 wound thereon with a plurality of windings.

The coil 2 is connected to a driving circuit 53 and an operation unit 56 and is formed at an outer side thereof with a sensor 55.

Now, operational effect of the present invention will be described.

Figure 3:
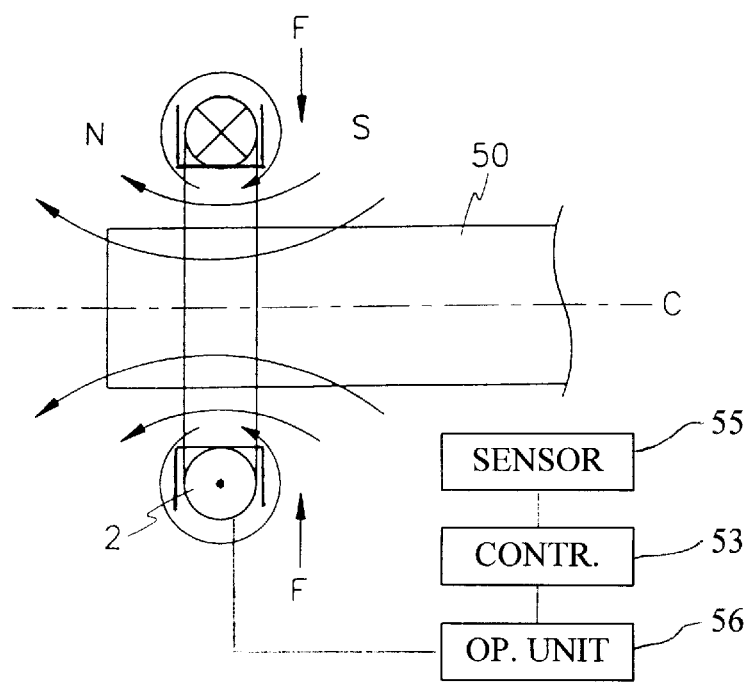
FIG. 3 is a constitutional diagram for illustrating an electromagnetic force being applied to a rotor body according to the present invention.

When an electrical current is applied to the coil 2, a magnetic force is generated as illustrated in FIG. 3.

In other words, a magnetic field is formed in a state perpendicular to a section of the coil 2 and an electromagnetic force F is generated to push the rotor body 50 to a rotating center.

When the rotor body 50 is moved as shown in the Figure, a flux density at a lower part is stronger than that of an upper part.

When the flux density at the lower part is stronger than that of the upper part, an electromagnetic force generated therefrom is increased to push the eccentric rotor body 50 to a core direction.

At this time, the operation unit 56 calculates a corrected current according to the eccentric correction input from the sensor 55 in order to swiftly and accurately expedite the core movement of the rotor body 50.

Particularly, mutual inductance is used in order to calculate the corrected current at the operation unit 56.

Figure 4:
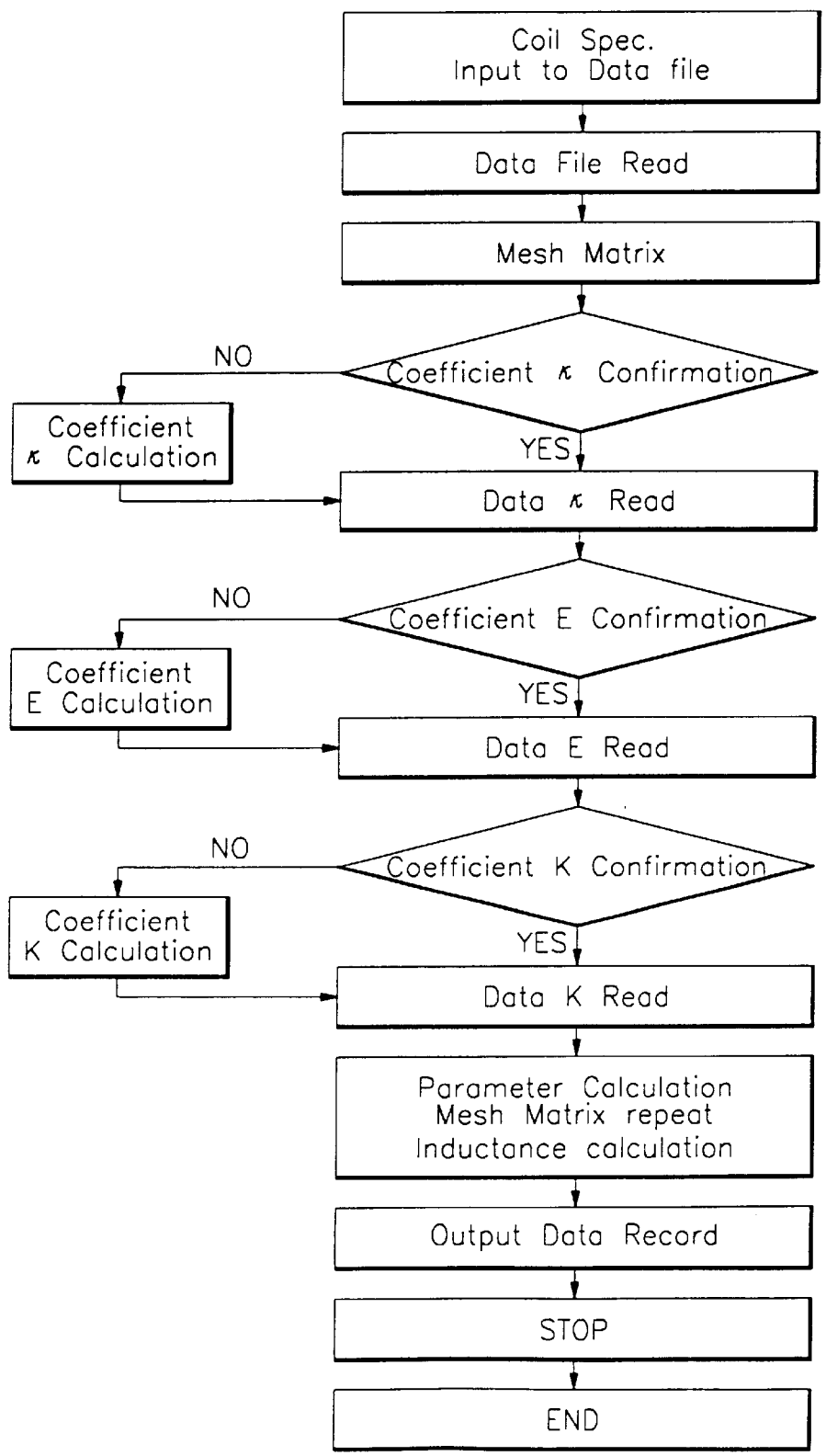
FIG. 4 is a flow chart for illustrating a process of calculating a mutual inductance according to the present invention.
Figure 5:
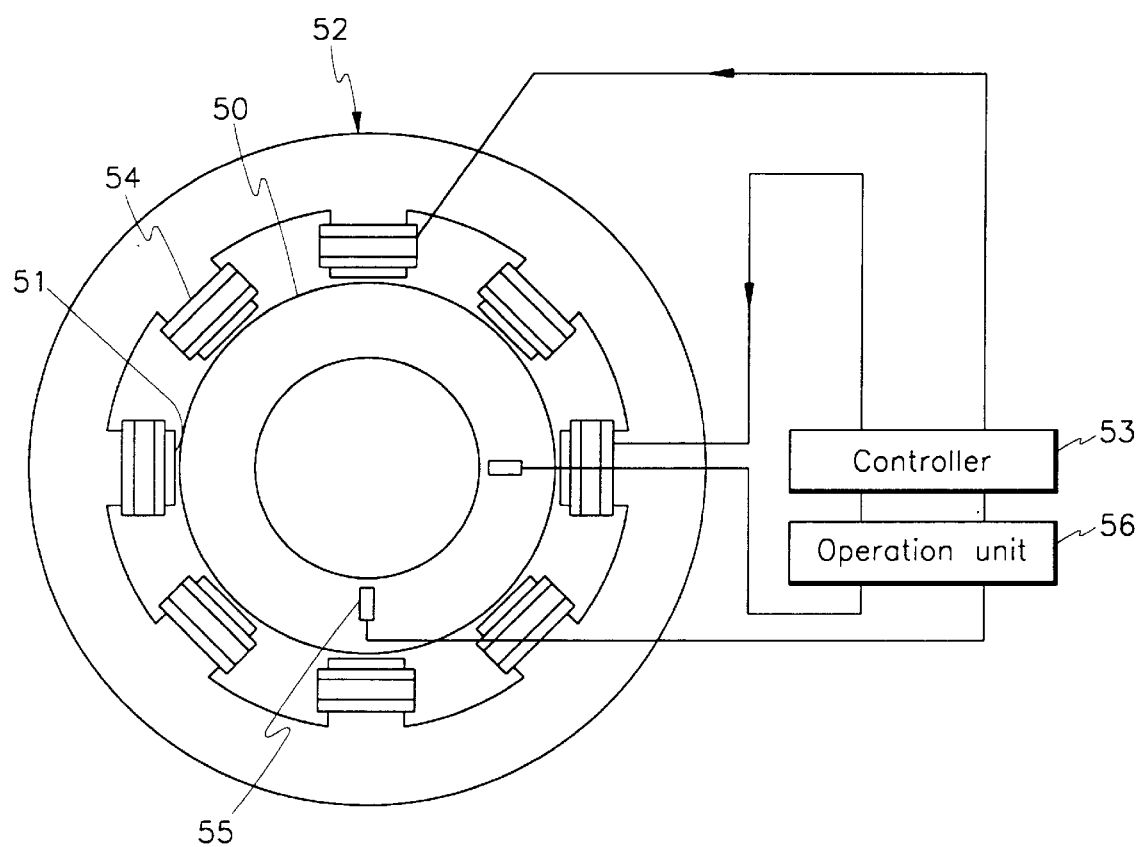
FIG. 5 is a schematic plan for illustrating a position control status of a rotor body in AMB which is a conventional concentricity control apparatus for a high speed induction motor.

The mutual inductance M between primary (p) and secondary (s) coils (or rotor and stator bobbin) having coil filaments (or equivalents) i and j (with respective cell columns g, k and rows h, l); and can be calculated by the following formula (1) and its calculating procedures are given in the flow chart at FIG. 4.

$$M_{ij} = \frac{\mu_o R_s}{2\pi\gamma} \int_{\phi_2=0}^{2\pi} [(R_p + \gamma)^2 + Z^2]^{\frac{1}{2}} \left[ \left(1 - \frac{1}{2}\kappa^2\right) K(\kappa) - E(\kappa) \right] d\Phi_2 \quad (1)$$

where, $\mu$=permeability,
$R_s$=a radius of the rotor,
$R_p$=a radius from the center axis of the stator bobbin to the coil,
$\gamma$=a distance from the center axis of the stator bobbin to a certain point on the rotor, which is derived from the eccentricity (y),
Z=an axial distance between the rotor and the stator bobbin (=0 in this case),
$\phi$=angular coordinate; and $$\kappa = \left[ \frac{4R_p\gamma}{(R_p + \gamma)^2 + Z^2} \right]^{\frac{1}{2}}$$

In other words, when an eccentric correction command is input into the operation unit 56, a pre-stored coil specification is read and concurrently, K value is ascertained. In case an appropriate K value is not stored, K value is calculated according to the following formula (2).

$$\kappa_{g,h,k,j} = \left[ \frac{4R_{ph}\gamma_l}{(R_{ph} + \gamma_l)^2 + Z_{g,k}^2} \right]^{\frac{1}{2}} \quad (2)$$

After the calculated K value is read, E value is again ascertained, and in case an appropriate E value is not input, the E value is calculated according to the following formula (3).

$$E = \int_0^{\pi/2} (1 - \kappa^2 \sin^2\theta)^{\frac{1}{2}} d\theta \quad (3)$$

After the E value is calculated and read, the K value is again searched from the stored memory. In case there is no appropriate value, K value is calculated according to the following formula (4).

$$K = \int_0^{\pi/2} \frac{1}{(1 - \kappa^2 \sin^2\theta)^{\frac{1}{2}}} d\theta \quad (4)$$

When K value is calculated, the following formulae (5), (6), (7) and (8) are operated and substituted into the formula (1) to calculate the mutual inductance.

$$\gamma_l^2 = (R_{st}\cos\Phi_2 + y)^2 + (R_{st}\sin\Phi_2)^2 \quad (5)$$

$$R_{ph} = R_p + \frac{H_p}{2N + 1} h \quad (6)$$

$$R_{st} = R_s + \frac{H_s}{2n + 1} \iota \quad (7)$$

$$Z_{g,k} = Z - \frac{W_p}{2M + 1} g + \frac{W_s}{2m + 1} k \quad (8)$$

where: Hp, Hs=primary and secondary coil thickness,
Wp, Ws=primary and secondary width,
M, N=cross-sectional number of rows, columns (forming cells) of primary coil,
m, n=cross-sectional number of rows, columns (forming cells) of secondary coil.

When the mutual inductance value is calculated by the aforesaid formulae, the driving circuit 53 adjusts the current so as to identify the mutual inductance value with the induced current value applied to upper and lower parts of the rotor body 50.

When the current is adjusted by the driving circuit 53, a stronger flux density is generated, and the core centering movement of the rotor body 50 is accurately expedited by the electromagnetic force according to the afore-mentioned flux density.

Particularly, compared with a conventional plurality of poles 51 and driving coil 54, the present invention is devoid of poles functioning as poles, so that controllable angles are remarkably widened and become more accurate.

Here, a calculating formula of a mutual inductance used in the conventional concentricity control apparatus is the conventional Neumann formula, which can be realized by the following formula (9), where, if it is presumed that the number of poles at an induction motor are 360, the mutual inductance becomes as 360×360=129,600 revolutions, whereby, the present invention produces 90×2=180 revolution because of no need of pole calculation.

$$M_{12} = \frac{\mu_0}{4\pi} \oint_{c1} \oint_{c2} \frac{d\iota_1 d\iota_2}{\gamma} \quad (9)$$

In other words, the calculation becomes simple to thereby simplify the structure of the driving circuit, so that accuracy of the calculation becomes increased.

As apparent from the foregoing, there is an advantage in that a concentricity control of concentricity controlling induction motor becomes easy and structure becomes simplified.

What is claimed is:

1. An active magnetic journal bearing for controlling an eccentricity of a rotor axle of a motor, comprising:
   a rotor connected to and rotating with the rotor axle of the motor;
   a stator bobbin cylindrically formed without any poles and disposed around said rotor with an air gap therebetween;
   a coil wound on the outside of said stator bobbin with a plurality of windings;
   a sensor for detecting any eccentricity of said rotor and said stator bobbin;
   an operation unit for calculating an instantaneous mutual inductance between said rotor and said stator bobbin based on the eccentricity detected by said sensor, for estimating a correction current to correct the detected eccentricity of the rotor according to the calculated mutual inductance, and for generating control signals corresponding to the estimated correction current in order to increase or decrease an electric current applied to said coil; and a driving circuit for controlling the electric current applied to said coil according to the control signals generated from said operation unit.

2. An active magnetic journal bearing as claimed in claim 1, wherein the instantaneous mutual inductance ($M_{ij}$) between said rotor and said stator bobbin is calculated by the following formula:

$$M_{ij} = \frac{\mu_o R_s}{2\pi\gamma} \int_{\phi_2=0}^{2\pi} [(R_p + \gamma)^2 + Z^2]^{\frac{1}{2}} \left[\left(1 - \frac{1}{2}\kappa^2\right)K(\kappa) - E(\kappa)\right] d\Phi_2$$

where, $\mu$=permeability,
$R_s$=a radius of the rotor,
$R_p$=a radius from the center axis of the stator bobbin to the coil,
$\gamma$=a distance from the center axis of the stator bobbin to a certain point on the rotor, which is derived from the eccentricity ($\mu$), $$\kappa = \left[\frac{4R_p\gamma}{(R_p + \gamma)^2 + Z^2}\right]^{\frac{1}{2}}$$

Z=an axial distance between the rotor and the stator bobbin (=0 in this case),

φ=angular coordinate
E, K=complete elliptic integrals of the first and second kind.

3. A method of controlling an eccentricity of a rotor axle of a motor for an active magnetic journal bearing which includes a rotor connected to and rotating with a rotor axle of the motor, a stator bobbin cylindrically formed without any poles and disposed about the rotor but separated from the rotor by an air gap, a coil wound on the outside of the stator bobbin with a plurality of windings, a sensor for detecting an eccentricity of the rotor in the stator bobbin, an operation unit for generating control signals in order to control an electric current applied to the coil, and a driving circuit for controlling the electric current applied to the coil according to the control signals generated from the operation unit, said method comprising the steps of:

detecting an eccentricity of the rotor in the stator bobbin;

calculating an instantaneous mutual inductance between the rotor and the stator bobbin on the basis of the detected eccentricity of the rotor;

estimating a correction current to correct the eccentricity of the rotor according to the calculated mutual inductance; and generating control signals corresponding to the estimated correction current to the driving circuit to increase or decrease an electric current applied to the coil.

* * * * *